(12) United States Patent
Vollenberg et al.

(10) Patent No.: US 7,799,838 B2
(45) Date of Patent: Sep. 21, 2010

(54) ELASTOMER BLENDS OF POLYESTERS AND COPOLYETHERESTERS DERIVED FROM POLYETHYLENE TEREPHTHALATE, METHOD OF MANUFACTURE, AND ARTICLES THEREFROM

(75) Inventors: Peter H. Vollenberg, Evansville, IN (US); Dhaval Shah, Evansville, IN (US); Kenneth F. Miller, Poseu, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/781,456

(22) Filed: Jul. 23, 2007

(65) Prior Publication Data

US 2008/0023887 A1   Jan. 31, 2008

Related U.S. Application Data

(60) Provisional application No. 60/820,455, filed on Jul. 26, 2006.

(51) Int. Cl.
*C08J 11/04* (2006.01)

(52) U.S. Cl. .................. 521/48; 521/40; 521/40.5; 521/41; 521/48.5; 528/271; 528/272; 528/300; 528/302; 528/308.1; 528/480; 528/495

(58) Field of Classification Search .............. 528/272, 528/271, 300, 302, 308, 308.1, 428; 525/92; 521/48.5, 40, 40.5, 41, 48
See application file for complete search history.

(56) References Cited

U.S. PATENT DOCUMENTS

| | | | |
|---|---|---|---|
| 2,465,319 A | 3/1949 | Whinfield et al. | |
| 2,720,502 A | 10/1955 | Caldwell | |
| 2,727,881 A | 12/1955 | Caldwell et al. | |
| 2,822,348 A | 2/1958 | Haslam | |
| 3,047,539 A | 7/1962 | Pengilly | |
| 3,671,487 A | 6/1972 | Abolins | |
| 3,701,755 A | 10/1972 | Sumoto et al. | |
| 3,766,146 A | 10/1973 | Witsiepe | |
| 3,864,428 A | 2/1975 | Nakamura et al. | |
| 3,907,868 A | 9/1975 | Currie et al | |
| 3,907,926 A * | 9/1975 | Brown et al. ................. | 524/258 |
| 3,909,926 A | 10/1975 | Hutson | |
| 3,953,394 A | 4/1976 | Fox et al. | |
| 3,953,404 A | 4/1976 | Borman | |
| 4,011,285 A | 3/1977 | Seymour | |
| 4,096,156 A | 6/1978 | Freudenberger et al. | |
| 4,128,526 A | 12/1978 | Borman | |
| 4,140,670 A | 2/1979 | Charles | |
| 4,154,775 A | 5/1979 | Axelrod | |
| 4,157,325 A | 6/1979 | Charles | |
| 4,184,997 A | 1/1980 | Wu | |
| 4,200,567 A | 4/1980 | Goldman | |
| 4,203,887 A | 5/1980 | Goedde | |
| 4,264,487 A | 4/1981 | Fromuth et al. | |
| 4,337,192 A | 6/1982 | Campbell | |
| 4,355,155 A * | 10/1982 | Nelsen ..................... | 528/301 |
| 4,469,851 A | 9/1984 | Charles et al. | |
| 4,579,884 A * | 4/1986 | Liu ........................ | 523/216 |
| 4,598,117 A * | 7/1986 | Liu et al. ............... | 524/444 |
| 4,609,680 A | 9/1986 | Fujita | |
| 4,767,668 A | 8/1988 | Smith | |
| 4,992,506 A | 2/1991 | McCormick | |
| 5,122,551 A * | 6/1992 | Gallucci et al. ............ | 523/217 |
| 5,162,424 A | 11/1992 | de Boer | |
| 5,221,704 A | 6/1993 | Shimotsuma et al. | |
| 5,266,601 A | 11/1993 | Kyber et al. | |
| 5,304,594 A | 4/1994 | Saitou | |
| 5,326,806 A | 7/1994 | Yokoshima et al. | |
| 5,413,681 A * | 5/1995 | Tustin et al. ............... | 203/80 |
| 5,451,611 A | 9/1995 | Chilukuri et al. | |
| 5,559,159 A * | 9/1996 | Sublett et al. ............. | 521/48.5 |
| 5,804,654 A | 9/1998 | Lo et al. | |
| 5,824,412 A | 10/1998 | Hausmann | |

(Continued)

FOREIGN PATENT DOCUMENTS

EP     0127981 A2   12/1984

(Continued)

OTHER PUBLICATIONS

International Search Report for PCT/US2007/074211 International filing Date Jul. 24, 2007, Mailing Date Jan. 30, 2008. (5 pages).
Written Opinion of the International Searching Authority for PCT/US2007/074211 International Filing Date Jul. 24, 2007, Mailing Date Jan. 30, 2008 (6 pages).
European Patent Office, PCT International Search Report: International Application No. PCT/US2007/002197, Date of Mailing: Jun. 19, 2007, 3 pgs.

(Continued)

*Primary Examiner*—Ling-Siu Choi
*Assistant Examiner*—Frances Tischler
(74) *Attorney, Agent, or Firm*—Cantor Colburn LLP

(57) ABSTRACT

A composition comprising:
  (1) from 50 to 99 wt % of a modified, random copolyetherester containing:
    (i) a modified, random polybutylene terephthalate copolymer block that is derived from a polyethylene terephthalate component selected from the group consisting of polyethylene terephthalate and polyethylene terephthalate copolymers and combinations thereof; and that contains at least one residue derived from the polyethylene terephthalate component; and
    (ii) a polyalkylene oxide copolymer block that is derived from a polyethylene terephthalate component and polyalkylene oxide glycol, and contains polyalkylene oxide and at least one residue derived from the polyethylene terephthalate component; and
  (2) from 1 to 50 wt % of a polyester;
wherein the copolyetherester, the polyester, and optionally any additives, are present in a total amount of 100 wt %.

51 Claims, No Drawings

U.S. PATENT DOCUMENTS

| | | | |
|---|---|---|---|
| 5,859,119 | A | 1/1999 | Hoefflin |
| 6,020,414 | A | 2/2000 | Nelsen et al. |
| 6,087,591 | A | 7/2000 | Nguyen |
| 6,162,837 | A | 12/2000 | Gerking et al. |
| 6,255,371 | B1 | 7/2001 | Schlosser et al. |
| 6,476,158 | B1 | 11/2002 | England et al. |
| 6,515,044 | B1 * | 2/2003 | Idel et al. .......... 523/351 |
| 6,706,843 | B1 | 3/2004 | Ishihara et al. |
| 6,849,684 | B2 | 2/2005 | Poppe |
| 6,887,909 | B2 | 5/2005 | Kawamura et al. |
| 7,183,362 | B2 | 2/2007 | Hirokane et al. |
| 7,388,067 | B2 | 6/2008 | Leemans et al. |
| 2002/0012807 | A1 | 1/2002 | Kurian et al. |
| 2004/0059084 | A1 | 3/2004 | Hirokane et al. |
| 2005/0137359 | A1 | 6/2005 | Agarwal |
| 2005/0209435 | A1 | 9/2005 | Hirokane et al. |
| 2007/0244242 | A1 | 10/2007 | Agarwal |
| 2007/0275242 | A1 | 11/2007 | Gopal et al. |
| 2008/0125551 | A1 | 5/2008 | Vollenberg |

FOREIGN PATENT DOCUMENTS

| | | |
|---|---|---|
| EP | 0127981 A3 | 12/1984 |
| EP | 0135493 A1 | 3/1985 |
| EP | 0142336 A1 | 5/1985 |
| EP | 0237306 | 9/1987 |
| EP | 0413560 A2 | 2/1991 |
| EP | 0683201 | 11/1995 |
| EP | 1437377 | 7/2004 |
| GB | 1431916 | 4/1976 |
| GB | 1500577 | 2/1978 |
| GB | 2048285 A | 12/1980 |
| JP | 58-141236 | 8/1983 |
| JP | 03-062848 | 3/1991 |
| JP | 06-240121 | 8/1994 |
| JP | 08-269311 | 10/1996 |
| JP | 2000256472 | 9/2000 |
| JP | 2000256920 | 9/2000 |
| JP | 2002-179801 | 6/2002 |
| JP | 200589572 | 4/2007 |
| KR | 20010083551 | 1/2001 |
| WO | 83/01253 | 4/1983 |
| WO | 96/35216 | 11/1996 |
| WO | 9950332 | 7/1999 |
| WO | 03066704 A1 | 8/2003 |
| WO | WO03/066704 | 8/2003 |
| WO | 2007111774 | 10/2007 |

OTHER PUBLICATIONS

S.H. Mansour and N. E. Ikladious, Depolymerization of Poly(ethylene terephthalate) Waste Using 1,4-Butanediol and Triethylene Glycol:, Journal of Elastomers and Plastics, vol. 35, Apr. 2003 p. 122-147.

"GE Gives Plastic Bottle Recycling a New Spin"; ChemicalProcessing.com, Aug. 25, 2006 [online], accessed via the internet [retrieved on Oct. 16, 2009], URS: <http://chemicalprocessing.com/industrynews/2006/056.html>, 2 pages.

Pawlak, et al.; "Characterization of Scrap Poly(ethylene Terephthalate)"; European Polymer Journal, 36, p. 1875-1884; (2000).

* cited by examiner

ELASTOMER BLENDS OF POLYESTERS AND COPOLYETHERESTERS DERIVED FROM POLYETHYLENE TEREPHTHALATE, METHOD OF MANUFACTURE, AND ARTICLES THEREFROM

CROSS REFERENCE TO RELATED APPLICATION

This application claims the benefits of U.S. Provisional Patent Application Ser. No. 60/820,455 filed Jul. 26, 2006, which patent application is fully incorporated herein by reference.

BACKGROUND OF THE INVENTION

This disclosure relates to compositions and methods of preparation of blends containing polyesters and copolyetherester elastomers, methods for their manufacture, and articles thereof. The elastomer blends are derived from recycled polyesters, in particular polyethylene terephthalate.

Polyethylene terephthalate (also referred to as "PET") is a polyester of terephthalic acid and ethylene glycol that can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents, and acids but not to bases. Semi-crystalline PET has good strength, ductility, stiffness, and hardness. Amorphous PET has better ductility but less stiffness and hardness. PET is used to make bottles for soft drinks and other household and consumer products. Generally, PET has many uses and several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET also wastes a significant resource that could be used more effectively.

Copolyetheresters, sometimes referred to as TPEE elastomers, are a special class of elastomeric materials. These materials exhibit thermoplastic processability on conventional molding equipment and exhibit the elasticity and resistance to impact and flex-fatigue of conventional cured rubbers. The combination of properties is obtained due to the result of the phase separation between the amorphous polyether segments (polyether blocks) and the crystalline polyester segments (polyester blocks) of the copolymer molecule. Because the immiscible segments are copolymerized into a single macromolecular backbone the necessary phase separation that occurs results in discrete domains with dimensions on the order of magnitude of the polymer chain. Thus, the polyether forms soft, amorphous domains that are physically crosslinked by the 'knots' of crystalline, polyester, domains. That is, the amorphous soft blocks provide the elastomeric properties of flexibility and low temperature impact while the presence of the crystalline hard block results in discrete melting points, heat and chemical resistance, and mechanical strength. These materials are also commonly characterized by a lower temperature brittleness point than conventional rubbers, resilience, low creep, and very good resistance to oils, fuels, solvents, and chemicals.

Although molding compositions using conventional polybutylene terephthalate (PBT) copolyetheresters are useful to many customers, these molding compositions may lack the ability to strike certain property balances, for example the combination of heat aging resistance with good flexibility, and/or the combination of chemical resistance to organic solvents with good flexibility.

To that end, blends of polyesters or polyester copolymers with copolyetheresters derived from recycled (scrap) PET create the ability and flexibility to create desired property balances for targeted applications.

Unfortunately, known solutions for making copolyetheresters do not offer effective ways of using PET scrap that meets today's customer needs. GB 1500577 discloses the treatment of scrap PET with an alkylene glycol in an amount of 0.1 to 5 times the weight of the scrap PET. In a preferred embodiment, GB 1500577 discloses that these materials are heated at 200 to 250° C. to reflux the glycol for a period of about 8 hours or until the solution becomes clear. The first portion of the glycolization step is preferably carried out at atmospheric pressure and the final portion preferably is carried out at a pressure of less than 0.5 mm Hg.

The examples of GB 1500577 disclose that "it will be observed that the modulus at various percents elongation for the product produced in accordance with the present invention is quite consistently about half of the modulus of the product produced in accordance with Example 4 of U.S. Pat. No. 3,701,755 when the ingredients are of closely comparable amounts." Example 4 of U.S. Pat. No. 3,701,755 discloses, that "12.17 parts of bis(2-hydroxyethyl) terephthalate, 20.0 parts of PTMG (molecular weight 1800) and 0.014 part [s] of zinc[ ] acetate were charged into a reaction vessel at 200° C. The pressure was gradually reduced while heating, and the polycondensation was conducted under a high vacuum of less than 1 mm. Hg for 80 minutes. The obtained copolymer had a melting point of 208° C. and $\eta_{sp./c.}$=3.03." When treated and modified "in ways known for treating segmented copolyetherester elastomers," GB 1500577 discloses that its product is useful in the production of such items as garden hoses, industrial hose material, industrial tires, and tennis shoe soles.

Today's demanding customer needs often require elastomeric products having excellent performance properties. Although GB 1500577 demonstrates a way of using scrap PET, elastomeric polymers that exhibit about half of the modulus of monomer/bis(2-hydroxyethyl) terephthalate-based materials are not acceptable to many customers today. Solutions that require additional modification would not be practical or feasible for manufacturers today.

Other attempts directed to using post-consumer polyesters such as scrap PET have been directed to methods and devices designed to recover polymers or polymeric components obtained during the depolymerization of polymers. U.S. Pat. No. 6,162,837, for instance, discloses a method and device for recovering linear polyesters, such as PET and PBT, from polyester waste of the most varied form, in a continuous manner, in which undried or not dried-through waste is melted, the polymer chains being hydrolytically degraded by adhering moisture, and in which diol, corresponding to the basic constitutional unit of the polymer, is added to the melt resulting in glycolytic degradation, and the melt so treated is further condensed to the desired degree of polymerization. EP 1437377 discloses a process that involves a depolymerization reaction of used PET bottles with ethylene glycol, recovering dimethyl terephthalate (DMT) by ester interchange reaction with methanol, obtaining terephthalic acid by hydrolysis of the recovered DMT, and manufacturing a PET polymer that can be used for manufacturing PET bottles again by using the terephthalic acid. However, such solutions do not address the need to make copolyetheresters that have suitable commercial properties from scrap PET, e.g., copolyetheresters having properties comparable to PBT-based copolyetheresters.

For the foregoing reasons, there is an unmet need to develop improved elastomer blends of polyesters and copolyetheresters derived from recycled PET which exhibit excellent performance properties.

BRIEF DESCRIPTION OF THE INVENTION

In one embodiment, an elastomer blend composition comprises: (1) from 50 to 99 wt % of a modified, random copolyetherester containing: a modified, random polybutylene terephthalate copolymer block that is derived from a polyethylene terephthalate component selected from the group consisting of polyethylene terephthalate and polyethylene terephthalate copolymers and combinations thereof; and that contains at least one residue derived from the polyethylene terephthalate component; and (ii) a polyalkylene oxide copolymer block that is derived from a polyethylene terephthalate component and polyalkylene oxide glycol, and contains polyalkylene oxide and at least one residue derived from the polyethylene terephthalate component; and (2) from 1 to 50 wt % of a polyester; wherein the copolyetherester, the polyester, and optionally any additives, are present in a total amount of 100 wt %.

Also disclosed is a composition comprising (a) from 55 to 99 wt % of a modified, random copolyetherester containing: (i) a modified, random polybutylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and (ii) a polyalkylene oxide copolymer block that is derived from a polyethylene terephthalate component and polyalkylene oxide glycol, and contains polyalkylene oxide and at least one residue derived from the polyethylene terephthalate component; and (b) from 10 to 45 wt % a polyester; (c) from 0.01 to 5 wt % of a carboxy reactive material, (d) from 0.01 to 2 wt % of a stabilizer composition selected from the group consisting of hindered diol stabilizers, thioester stabilizers, amine stabilizers, phosphite stabilizers, and combinations thereof, (e) from 0 to 5 wt % of at least one colorant, wherein ingredients (a) to (e) are present in a total amount of 100 wt %.

In another embodiment, a process for making a copolyetherester derived from a recycle component comprises: (a) depolymerizing a polyethylene terephthalate component selected from the group consisting of polyethylene terephthalate and polyethylene terephthalate copolymers by reacting the (i) polyethylene terephthalate component with (ii) 1,4-butane diol at a pressure that is at least atmospheric pressure in the presence of a catalyst component, under an inert atmosphere conditions sufficient to depolymerize the polyethylene terephthalate component into a molten mixture containing oligomers, 1,4-butane diol, ethylene glycol, and mixtures thereof; wherein the polyethylene terephthalate component and the diol are combined in the liquid phase under agitation and the diol is refluxed back into the reactor; and (b) agitating the molten mixture under subatmospheric pressure and removing excess diol, ethylene glycol, tetrahydrofuran; wherein the polyalkylene oxide glycol is added during the process in an amount and under conditions that are sufficient to form the copolyetherester.

Another process for making the copolyetherester of the composition comprises (a) depolymerizing a polyethylene terephthalate component selected from the group consisting of polyethylene terephthalate and polyethylene terephthalate copolymers by agitating the polyethylene terephthalate component with member selected from the group consisting of ethylene glycol, 1,3 propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol, and combinations thereof; (b) adding 1,4-butane diol to the first molten mixture in a reactor in the presence of a catalyst component, under conditions that are sufficient to form a second molten mixture containing a component selected from the group consisting of oligomers containing ethylene terephthalate moieties, oligomers containing terephthalate moieties, propylene glycol, 1,4 butane diol, ethylene glycol, and combinations thereof; and (c) subjecting the second molten mixture to subatmospheric conditions and agitation sufficient to form the copolyetherester of the composition of claim 1; wherein the polyalkylene oxide glycol is added during the process in an amount and under conditions that are sufficient to form the copolyetherester and oligomers containing terephthalate moieties, propylene glycol, and ethylene glycol are removed during formation of the copolyetherester.

In another embodiment, a method for the manufacture of the above-described compositions comprises combining the components of the compositions.

In still another embodiment, an article is provided comprising the above-described compositions.

A method of manufacture of an article comprises molding or extruding the above-described compositions.

These and other features, aspects, and advantages of the present invention will become better understood with reference to the following description and appended claims.

DETAILED DESCRIPTION OF THE INVENTION

The invention is based on the discovery that it is now possible to make blends of polyesters and copolyetheresters derived from scrap PET that exhibit outstanding performance properties. Unlike conventional blends of polyesters and copolyetheresters containing copolyetheresters derived from monomers, the copolyetheresters of the invention contain residues derived from polyethylene terephthalate, e.g., ethylene glycol, isophthalic acid, and diethylene glycol groups. Despite this, the copolyetheresters impart excellent performance properties and can be used in many applications.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to weight average molecular weights. All such mentioned molecular weights are expressed in daltons.

All ASTM tests and data are from the 2003 edition of the Annual Book of ASTM Standards unless otherwise indicated.

The terms terephthalic acid group, isophthalic acid group, butanediol group, and ethylene glycol group in the formulas have the following meanings. The term "terephthalic acid group" (R') in a composition refers to a divalent 1,4-benzene radical (-1,4-$C_6H_4$—) remaining after removal of the carboxylic groups from terephthalic acid-. The term "isophthalic acid group" (R") refers to a divalent 1,3-benzene radical (-1,3-$C_6H_4$—) remaining after removal of the carboxylic groups from isophthalic acid. The term "butanediol group" (D) refers to a divalent butylene radical (—$C_4H_8$—) remaining after removal of hydroxyl groups from butanediol. The term "ethylene glycol group" (D') refers to a divalent ethylene radical (—$C_2H_4$—) remaining after removal of hydroxyl groups from ethylene glycol. With respect to the terms "isophthalic acid group," "ethylene glycol group," and "diethylene glycol group" being used in other contexts, e.g., to indicate the weight percent (wt %) of the group in a composition, the term "isophthalic acid group(s)" means the group having the formula —OC(O)$C_6H_4$C(O)—, the term "terephthalic acid group(s)" means the group having the formula —OC(O)$C_6H_4$C(O)— the term diethylene glycol group means the group having —O$C_2H_4$—O—$C_2H_4$—, the term "butane diol group(s)" means the group having the formula —O$C_4H_8$—, and the term "ethylene glycol groups(s)" means the group having formula —O$C_2H_4$—.

The invention relates to a composition comprising:
(1) from 50 to 99 wt % of a modified, random copolyetherester containing:
  (i) a modified, random polybutylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and
  (ii) a polyalkylene oxide copolymer block that is derived from a polyethylene terephthalate component and polyalkylene oxide glycol, and contains polyalkylene oxide and at least one residue derived from the polyethylene terephthalate component; and
(2) from 1 to 50 wt % a polyester;
wherein the copolyetherester, the polyesters and optionally any additives, are present in a total amount of 100 wt %.

The residue derived from the polyethylene terephthalate component includes various oligomers or molecular fragments arising from the depolymerization of polyethylene terephthalate. The residue accordingly can include ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, sodium benzoate alkaline salts, alkali salts, e.g., including calcium, magnesium, sodium and potassium salts, phosphorous-containing compounds, napthalene and anions, sulfur-containing compounds and anions, napthalene dicarboxylic acids, 1,3-propane diol, cobalt-containing compounds groups, and combinations thereof.

Depending on factors such as polyethylene terephthalate and polyethylene terephthalate copolymers, the residue can include various combinations. In one embodiment, for instance, the residue derived from the polyethylene terephthalate component comprises mixtures of ethylene glycol and diethylene glycol. Such mixtures can include additional materials, such as isophthalic acid. Such mixtures can also include the cis isomer of 1,3-cyclohexane dimethanol, cis isomer of 1,4-cyclohexane dimethanol, trans isomer of 1,3-cyclohexane dimethanol, trans isomer of 1,4-cyclohexane dimethanol and combinations thereof. In one embodiment, the residue derived from the polyethylene terephthalate component can selected from the group of cis isomer of 1,3-cyclohexane dimethanol, cis isomer of 1,4-cyclohexane dimethanol, the trans isomer of 1,3-cyclohexane dimethanol, trans isomer of 1,4-cyclohexane dimethanol and combinations thereof. In another embodiment, the residue derived from the polyethylene terephthalate component can be selected from the group consisting of ethylene glycol groups, diethylene glycol groups, isophthalic acid groups, cis isomer of 1,3-cyclohexane dimethanol, trans isomer of 1,3-cyclohexane dimethanol, cis isomer of 1,4-cyclohexane dimethanol, trans isomer of 1,4-cyclohexane dimethanol, and combinations thereof. In another embodiment, the residue derived from the polyethylene terephthalate component comprises mixtures of ethylene glycol, diethylene glycol, and cobalt-containing compounds. As above, in such mixtures, the at least one residue derived from the polyethylene terephthalate component further comprises isophthalic acid groups.

The molar amounts of the residue derived from the polyethylene terephthalate component can vary. In one embodiment, the residue selected from the polyethylene terephthalate component is selected from the group consisting of ethylene glycol groups, diethylene glycol groups, and cyclohexane dimethanol groups and is in an amount ranging from 0.1 to 10 mole %, based on 100 mole % of glycol in the copolyetherester. In another embodiment, the residue derived from the polyethylene terephthalate component further comprises isophthalic acid groups in an amount ranging from 0 to 10 mole %, based on 100 mole % of acid functionality in the copolyetherester. The total amount of materials of the polyethylene terephthalate residue can vary. For instance, sometimes, mixtures can be in an amount ranging from 1.8 to 2.5 wt %, or from 0.5 to 2 wt %, or from 1 to 4 wt %. The diethylene glycol group can be present in an amount ranging from 0.1 to 10 mole %, based on 100 mole % of glycol in the copolyetherester. The isophthalic acid group is present in an amount ranging from 0.1 to 10 mole %, based on 100 mole % of acid in the copolyetherester.

The amount of the random polybutylene terephthalate copolymer block in the copolyetherester can vary. In one embodiment, the amount of the random polybutylene terephthalate copolymer ranges from 5 to 95, specifically 20 to 80 wt %, based on 100 wt % of total copolyetherester.

The recycle PET component from which the random polybutylene terephthalate block copolymer is made can be in any form that can be used according to our invention. Generally, the PET component includes recycle (scrap) PET in flake, powder/chip, film, or pellet form. Before use, the recycle PET is generally processed to remove impurities such as paper, adhesives, polyolefin, e.g., polypropylene, polyvinyl chloride (PVC), nylon, polylactic acid, and other contaminants. Also, the recycle PET component can include PET that is not waste in flake, chip, or pellet form. As such, PET that would ordinarily be deposited in landfills can now be used productively and effectively. In one embodiment, the recycle PET component can also include other polyesters. The recycle PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, polyxylylene terephthalate, polydianol terephthalates, polybutylene terephthalate, polytrimethylene terephthalate, polyester naphthalates, and combinations thereof.

The polyalkylene oxide glycol can be selected from the group consisting of polyethylene oxide glycols, polypropylene oxide glycols, polybutylene oxide glycols, and combinations thereof. The polyalkylene oxide can be selected from the group consisting of polyethylene oxide, polypropylene oxide, polybutylene oxide, and combinations thereof. The amounts will vary, depending on the process conditions, customer needs, and the like.

The process for making the copolyetheresters in the blends can vary. In one embodiment, for instance, the process involves the steps of:
(a) depolymerizing a polyethylene terephthalate component selected from the group consisting of polyethylene terephthalate and polyethylene terephthalate copolymers by reacting the
   (i) polyethylene terephthalate component with
   (ii) 1,4-butanediol at a pressure that is at least atmospheric pressure in the presence of a catalyst component, under an inert atmosphere conditions sufficient to depolymerize the polyethylene terephthalate component into a molten mixture containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers butylene isophthalate moieties, covalently bonded oligomeric moieties containing at least two of the foregoing moieties, 1,4-butane diol, ethylene glycol, and combinations thereof; wherein the polyethylene terephthalate component and the diol are combined in the liquid phase under agitation and the diol is refluxed back into the reactor; and
(b) agitating the molten mixture under subatmospheric pressure and removing excess diol, ethylene glycol, and tetrahydrofuran; wherein the polyalkylene oxide glycol is added during the process in an amount and under conditions that are sufficient to form the copolyetherester.

The temperatures used in such a variation can vary. In this version, for instance, the polyethylene terephthalate can be depolymerized in various temperatures, e.g., a temperature ranging from 180° C. to 260° C. The temperature of the molten mixture is increased to a temperature ranging from 240° C. to 270° C.

The polyalkylene oxide glycol can be added at various stages of the process. In one embodiment, the polyalkylene oxide glycol is added during the depolymerization of the polyethylene terephthalate component. In another embodiment, the polyalkylene oxide glycol is added during the agitation of the molten mixture under subatmospheric pressure.

Also, the process contains an advantageous version in which the 1,4-butane diol, polyalkylene oxide glycol, 1,3-propane diol, and combinations thereof are derived from biomass, e.g., a grain such as corn or wheat, cellulosic material, and combinations thereof.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, (e.g., succinic acid), monomers used to make polymers; and the like. Biomass-based diols can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butane diol by processes described in several references, such as in U.S. Pat. No. 4,096,156. Biomass-derived 1,4-butane diol can also be converted to tetrahydrofuran, and further converted to polytetrahydrofuran, also known as polybutylene oxide glycol. Another process that describes converting succinic acid into 1,4-butane diol is sort forth in Life Cycles Engineering Guidelines, by Smith et al., as described in EPA publication EPA/600/R-1/101 (2001).

Thus, in a specific embodiment, the copolyetheresters can be made by:
(a) depolymerizing a polyethylene terephthalate component selected from the group consisting of polyethylene terephthalate, polyethylene terephthalate copolymers, and a combination thereof, by agitating the polyethylene terephthalate component with a member selected from the group consisting of ethylene glycol, 1,3 propane diol, and a combination thereof, in a reactor at a pressure that is at least atmospheric pressure in the presence of a catalyst component under conditions sufficient to depolymerize the polyethylene terephthalate component into a first molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol, and combinations thereof;
(b) adding 1,4-butane diol to the first molten mixture in a reactor in the presence of a catalyst component, under conditions that are sufficient to form a second molten mixture containing a component selected from the group consisting of oligomers containing ethylene terephthalate moieties, oligomers containing trimethylene terephthalate moieties, propylene glycol, ethylene glycol, and combinations thereof; and
(c) subjecting the second molten mixture to subatmospheric conditions and agitation sufficient to form the copolyetherester; and
(d) adding the polyalkylene oxide glycol during the process in an amount and under conditions that are sufficient to form the copolyetherester, and oligomers containing trimethylene terephthalate moieties, propylene glycol, and ethylene glycol are removed during formation of the copolyetherester.

The embodiment can also include variations. For instance, temperatures used during the process can vary. The polyethylene terephthalate component, for instance, can be depolymerized at a temperature ranging from 190 to 250° C., under an inert atmosphere. Step (b) of this embodiment (where 1,4-butane diol is added to the first molten mixture) can be conducted at a temperature ranging from 190 to 240° C. During step (c) (where the second molten mixture is subjected to subatmospheric conditions and agitation sufficient to form the copolyetherester), the temperature can be increased to a temperature ranging from 240 to 260° C.

The polyalkylene oxide glycol can be added at different stages of this embodiment. In one embodiment, the polyalkylene oxide glycol is added during the depolymerization of the polyethylene terephthalate component. In another embodiment, the polyalkylene oxide glycol is added during the agitation of the first molten mixture. In another embodiment, the polyalkylene oxide glycol is added during the agitation of the second molten mixture.

The member selected from the group consisting of 1,4-butane diol, polyalkylene oxide glycol, and combinations thereof can be derived from biomass. In one embodiment, the biomass is a grain selected from the group consisting of corn, wheat, and combinations thereof.

The polyalkylene oxide can be selected from the group consisting of polyethylene oxide, polypropylene oxide, polybutylene oxide, and combinations thereof. The amounts will vary, depending on the process conditions, customer needs, and the like. In one embodiment, a polybutylene oxide glycol is used to provide the polyoxyalkylene groups, i.e., the polyalkylene oxide copolymer block comprises poly(1,4-butylene oxide). The polybutylene oxide glycol can have a number-average molecular weight of 100 to 5000 daltons, or more specifically, 150 to 4,000, or even more specifically, 200 to 3,000 daltons. In a specific embodiment, a combination of long and short chain polybutylene oxide glycols is used, for example a polybutylene oxide glycol component having a number average molecular weight of 100 to 5000 daltons, and another polybutylene oxide glycol component having a molecular weight of less than 250. A specific polybutylene oxide glycol for use in the foregoing embodiments is poly(1,4-butylene oxide) glycol.

Thus, in a specific embodiment, copolyetheresters used in the blends can comprise the following:

(1) a long chain ester having the formula:

wherein G is the divalent polyalkylene oxide radical remaining after removal of the terminal hydroxyl groups from a poly(butylene oxide) glycol having a number-average molecular weight of 100 to 5000 daltons; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (2) short-chain ester units having the formula:

-continued

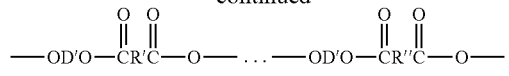

wherein D is the divalent butylene radical remaining after removal of the hydroxyl groups from butanediol having a molecular weight of less than 250; and R' and R" are as defined above; and wherein D' is a divalent ethylene radical after removal of hydroxyl groups of ethylene glycol or diethylene glycol.

In a specific embodiment, the copolyetherester comprising polybutylene oxide groups further comprises terephthalic acid groups. Such copolymers can have 25 to 65 wt %, more specifically 30 to 60 wt %, even more specifically 25 to 55 wt % of units derived from polybutylene oxide glycol or a chemical equivalent thereof, based on the weight of the copolymer. A poly(butylene terephthalate-butylene oxide) copolymer can further comprise isophthalic acid in addition to terephthalic acid. In one embodiment, the poly(butylene terephthalate/isophthalate-o butylene oxide) copolymer comprises 0 to 40 mole % of units derived from isophthalic acid or a chemical equivalent thereof, based on the total number of isophthalate and terephthalate units. For example, the poly(butylene terephthalate/isophthalate-oxytetramethylene) copolymer can comprise less than 5 mole % of isophthalate units, specifically 0 to 5 mole % of isophthalate units, based on the total number of isophthalate and terephthalate units in the copolymer. In another embodiment, the poly(butylene terephthalate/isophthalate-oxytetramethylene) copolymer comprises greater than 5 mole % of isophthalate units, specifically 5 to 40 mole %, based on the total number of isophthalate and terephthalate units in the copolymer.

The copolyetheresters made from the recycle PET can be characterized by the glass transition temperature (Tg) of the soft block and the melting temperature (Tm) of the hard block. In general, the Tg of the soft block can be 25 to −85° C., specifically −45 to −65° C., and the Tm of the hard block can be 120 to 200° C., specifically 150 to 195° C.

Suitable polyesters include those comprising structural units of the following formula (I):

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2-6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference: U.S. Pat. Nos. 2,465,319; 2,720,502; 2,727,881; 2,822,348; 3,047,539; 3,671,487; 3,953,394; 4,128,526.

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4-, 1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof.

Also contemplated herein are the above polyesters with minor amounts, e.g., from about 0.5 to about 25 percent by weight, of units derived from aliphatic acid and/or aliphatic polyols to form copolyesters. The aliphatic polyols include glycols, such as polytetramethylene oxide glycol or poly(ethylene glycol) oxide or poly(butylene glycol). Such polyesters can be made following the teachings of, for example, U.S. Pat. Nos. 2,465,319 and 3,047,539.

Examples of particularly suitable polyesters include polyalkylene terephthalates selected from the group of polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylylene terephthalate, polydianol terephthalates, polybutylene terephthalate, polyester naphthalates, and combinations thereof.

In another embodiment, the polyester can include polyesters that contain at least one residue derived from the recycle polyethylene terephthalate component. Such polyesters include (1) modified polybutylene terephthalate random copolymers derived from a polyethylene terephthalate component selected from the group consisting of polyethylene terephthalate and polyethylene terephthalate copolymers and containing at least one residue derived from the polyethylene terephthalate component and (2) polytrimethylene terephthalate random copolymers that are derived from polyethylene terephthalate component selected from the group consisting of polyethylene terephthalate and polyethylene terephthalate copolymers and containing at least one residue derived from the polyethylene terephthalate component. The modified polybutylene terephthalate random copolymers can be made by any suitable method in which a polyethylene terephthalate component is depolymerized with a diol and the resulting mixture is polymerized with 1,4-butanediol into the modified polybutylene terephthalate random copolymer. Similarly, the modified polytrimethylene terephthalate random copolymer can be made by any suitable method in which a polyethylene terephthalate component is depolymerized with a diol and the resulting mixture is polymerized with 1,3-propanediol into the modified polytrimethylene terephthalate random copolymer. The amount of the polyester is generally at least 1 wt % and can range from 1 wt % to 50 wt %.

The blends can contain additives, e.g., carboxy reactive components and flame retardants.

The flame-retarding component can be added to the composition to suppress, reduce, delay or modify the propagation of a flame through a composition or an article based on the composition. The flame-retarding components can be halogenated hydrocarbons (chlorine and/or bromine containing compounds and reactive flame retardants), inorganic flame retardants (boron compounds, antimony oxides, aluminum hydroxide, molybdenum compounds, zinc and magnesium oxides), phosphorous containing compounds (organic phosphate esters, phosphates, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, other inorganic flame retardant compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, as well as others.

The flame-retarding component can be added the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphine, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, and other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy)ethane, tetrabromobiphenyl ether, hexabromocyclododecane, tribromophenol, bis(tribromophenoxy)ethane, tetrabromobisphenol A polycarbonate oligomers, and tetrabromobisphenol A epoxy oligomers. Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly(haloaryl acrylate), poly(haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame-retarding component can include phosphorus-containing compounds. Examples of suitable phosphorous flame retardants include red phosphorus, ammonium polyphosphate. Organophoshorus flame retardants can include halogenated phosphates, non-halogenated compounds. Examples of such materials include tris(1-chloro-2-propyl) phosphate, tris(2-chloroethyl) phosphate, tris(2,3-dibromopropyl) phosphate, phosphate esters, trialkyl phosphates, triaryl phosphates, aryl-alkyl phosphates, and combinations thereof. Other flame retardants can include polyols, phosphonium derivatives, phosphonates, phosphanes, and phosphines.

Specific phosphorous-containing compounds include phosphates of the formula:

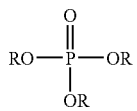

wherein each R is independently a $C_{1-18}$ alkyl, cycloalkyl, aryl, or arylalkyl, e.g., cyclohexyl, isopropyl, isobutyl, and the like; phosphonates of the formula:

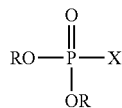

wherein X is H, and each R is independently a $C_{1-18}$ alkyl, cycloalkyl, aryl, or arylalkyl, e.g., cyclohexyl, isopropyl, isobutyl, and the like; phosphinates of the formula

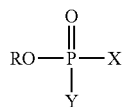

wherein X and Y is H, and R is a $C_{1-18}$ alkyl, cycloalkyl, aryl, or arylalkyl, e.g., cyclohexyl, isopropyl, isobutyl, and the like; phosphine oxides of the formula:

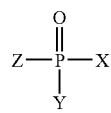

wherein X, Y, and Z are H and R, is a $C_{1-18}$ alkyl, cycloalkyl, aryl, arylalkyl, e.g., cyclohexyl, isopropyl, isobutyl, and the like; phosphines of the formula:

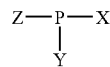

wherein X, Y, and Z is each independently a H, $C_{1-18}$ alkyl, cycloalkyl, aryl, arylalkyl, and the like; or a phosphite of the formula:

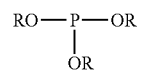

wherein each R is independently the same or different can be selected from the group of $C_{1-18}$ alkyl, cycloalkyl, aryl, or arylalkyl, e.g., cyclohexyl, isopropyl, isobutyl, and the like, and H.

As such, suitable flame retarding that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

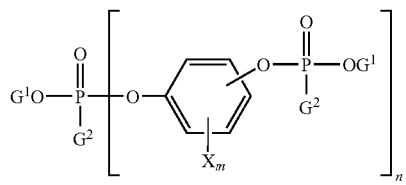

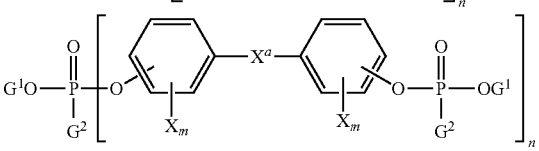

-continued

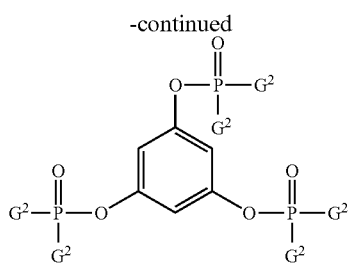

wherein each G¹ is independently a hydrocarbon having 1 to about 30 carbon atoms; each G² is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame-retarding compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 30 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula:

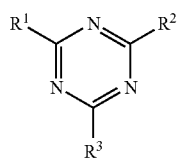

wherein $R^1$, $R^2$, and $R^3$ are independently $C_{1-12}$ alkyl, $C_{1-12}$ alkoxyl, $C_{6-12}$ aryl, amino, $C_{1-12}$ alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds.

The phosphinates and diphosphinates include those set forth in U.S. Pat. No. 6,255,371 to Schosser et al. Specific phosphinates mentioned includes aluminum diethylphosphinate (DEPAL), and zinc diethylphosphinate (DEPZN). The phosphinates have the formula:

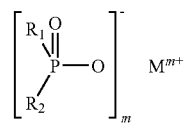

and/or formula:

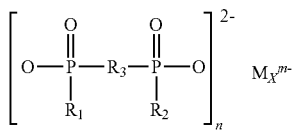

and/or polymers comprising units derived from formulas (18) or (19), wherein $R_1$ and $R_2$ are the same or different, and are H, $C_{1-6}$ alkyl (linear or branched), and/or aryl; $R_3$ is $C_{1-10}$ alkylene, (linear or branched), $C_{6-10}$ arylene, $C_{6-10}$ alkylarylene or $C_{6-10}$ arylalkylene; M is any metal, e.g., magnesium, calcium, aluminum or zinc, m is 1, 2 or 3; n is 1, 2 or 3; and x is 1 or 2. In one embodiment, $R_1$ and $R_2$ can be H, in addition to the substituents referred to set forth. This results in a hypophosphite, a subset of phosphinate, such as calcium hypophosphite, aluminum hypophosphite and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame-retarding thermoplastics.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt %. In another embodiment, the amount of the flame retarding component ranges from 0.01 to 20 wt %, or from 10 to 20 wt. %, based on the weight of polymer in the final composition.

The carboxy-reactive material is a monofunctional or a polyfunctional carboxy-reactive material that can be either polymeric or non-polymeric. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from BASF under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the trade names EPON 826, 828, and 871; from Ciba-Giegy Corporation under the trade names CY-182 and CY-183; and from Dow Chemical Co. under the tradename ERL-4221 and ERL-4299. As set forth in the Examples, BASF is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

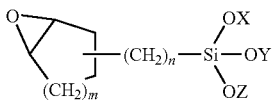

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl)ethyltriethoxysilane, available under the trade name CoatOSil 1770 from Momentive Performance Materials, Inc. Other examples are β-(3,4-epoxycyclohexyl)ethyltrimethoxysilane, available under the trade name Silquest A-186 from Momentive Performance Materials, Inc, and 3-glycidoxypropyltriethoxysilane, available under the trade name Silquest Y-15589 from Momentive Performance Materials, Inc.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art may determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 weight percent (wt. %) based on the weight of the total composition In one embodiment, the amount of the carboxy-reactive material is 0.01 to 30 wt %, or more, specifically 0.01 to 20 wt %, 1 to 10 wt %, more specifically 1 to 5 wt %, based on the total polymer.

The blends are made by combining suitable amounts of copolyetheresters and polyesters. In one embodiment, the process involves making a copolyetherester by either process described above and further adding a polyester in sufficient amounts to form the blend. More particularly, in one embodiment, the ingredients can be tumble-blended and then compounded on a twin screw extruder with vacuum vented co-rotating mixing screws. The temperature can be set at a suitable temperature, e.g., from 200 to 250° C. and screw speed between a setting such as 400 and 450 rpm. The extrudate is cooled through a water bath prior to pelletization. The typical output rate for the extruder is about 50 lbs/hr (approximately 127 kg). Other outputs are possible.

Articles can be made from the blends by molding or extrusion processes that are well known in the art. As such, in one embodiment, the invention relates to an article molded or extruded from compositions encompassed by the invention. Exemplary articles made from these compositions include constant velocity joint boots, prop shaft boots, rear wheel drive boots, air ducts, hoses or tubes. In one embodiment, a method of forming a composition with improved heat stability comprises melt blending the components of any of the compositions encompassed by the invention. In another embodiment, a method of forming an article comprises shaping, extruding, blow molding, or injection molding any of the compositions encompassed by the invention.

The invention provides previously unavailable advantages. For instance, the invention provides copolyetherester blends that have performance profiles that are competitive with ordinary copolyetheresters that are made from monomers, despite being derived from the polyethylene terephthalate component. Since the copolyetheresters are not based on monomers, the invention reduces the demand of raw materials and increases demand for the use of PET and thereby reduces the need to dispose PET scrap in landfills or by incineration.

Further, the process for making the elastomer blends can advantageously substantially reduce carbon dioxide emissions and solid waste. Since the elastomer blends are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is substituted by a scrap PET component, e.g., polyester scrap. The process to make DMT or TPA from crude oil is highly energy intensive and as a result, substantial emissions of carbon dioxide ($CO_2$) to the atmosphere occurs from burning of non-renewable energy sources. By not using DMT or TPA to make the PET-derived modified PBT, carbon dioxide emissions savings are obtained. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings and reduced carbon dioxide emissions when the ethylene glycol by-product is recovered and is used instead of ordinary ethylene glycol in manufacturing.

Additionally, when the source of BDO is from biomass-derived feedstocks such as succinic acid, the carbon dioxide savings are further increased for two reasons. Biomass-derived succinic acid is made form sugars or other biomass-derived hydrocarbons that are derived from atmospheric carbon rather than fossil fuel carbon sources, thus reducing the environmental impact of the polymer derived from BDO using succinic acid from biomass sources. Furthermore, the fermentation to yield succinic acid requires carbon dioxide as an input thus leading to further carbon dioxide reductions.

Advantageously, modified polybutylene terephthalate random copolymers can have a reduced $CO_2$ emissions index. The reduced $CO_2$ emissions index, as defined in this application, is the amount of $CO_2$, expressed in kilogram (kg), that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, the modified PBT random copolymers have a reduced $CO_2$ emissions index that is more than approximately 1.3 kg, and can range from 1.3 kg to 2.5 kg.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more particularly from 1.7 kg to 2.2 kg. This difference is based on calculations for the entire process that starts from crude oil to the monomers to the PBT, versus the process of converting scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil.

These results can be derived and verified by using material and energy balance calculations (calculations that are well know in the chemical engineering art) and comparing the amount of energy used to make modified PBT random copolymers from PET and the amount of energy used to make PBT from the monomer terephthalic acid.

The invention is further described in the following illustrative examples in which all parts and percentages are by weight unless otherwise indicated.

EXAMPLES

The examples demonstrate that materials having a certain composition show desirable properties. More preferred compositions show a combination of, among other desirable properties, low temperature impact ductility (as measured at –40° C., according to ASTM D256 and ISO 180) and good heat aging behavior.

Materials

The following materials were used as the starting materials for the blends.

Thermoplastic polyether-ester (TPEE) elastomers: Commercially available Hytrel® 4056 TPEE, manufactured by DuPont, and experimental material TPEE derived from post consumer recycle polyethylene terephthalate (PCR-PET). Table 1 contains intrinsic viscosity (IV), the melt temperature of the polyester component, Tm, in degrees Centigrade (° C.), the glass transition temperature of the polyester component, Tg, in ° C., as measured by DSC. Table 1 also contains the composition as measured by NMR (see section Testing Protocols/Techniques/Procedures). PTHF stands for poly(oxytetramethylene)glycol or polyTHF, which constitutes the so-called soft blocks in these elastomers.

TABLE 1

| Manufacturer/Description | Unit | Hytrel 4056 Dupont | TPEE derived from PCR-PET |
|---|---|---|---|
| IV | -dL/g | 1.46 | 1.03 |
| Tm | ° C. | 150 | 158 |
| Tc | ° C. | 63 | 87 |
| Co-Polyether, PTHF | wt % | 45 | 48 |
| Co-Polyester, PBT | wt % | 55 | 52 |
| Co-Polyester, PET | wt % |  | 0.06 |
| Terephthalate vs. Isophthalate in PBT | mol % | 78 | 84 |
| Isophthalate vs. terephthalate in PBT | mol % | 22 | 16 |
| Degree of polymerization in PTHF | DP | 10.6 | 10.6 |
| Degree of polymerization in PBT | DP | 4.5 | 3.9 |

Polyesters: Valox® 315 polybutylene terephthalate (PBT), PCR-PET derived PBT, both from General Electric.

Additives: Tinuvin 622LD from Ciba Geigy; Seenox 412S (pentaerythritol tetrakis (B-laurylthiopropionate)); Naugard 445 from Crompton.

Colorants: Titanium Dioxide, available from DuPont, Carbon Black available from Cabot Corporation, Pigment Green 7, Phthalo Cyanine and Solvent Yellow 93, available from BASF.

Preparation Process/Techniques

The ingredients were tumble-blended and then compounded on a 27 mm Werner Pfleiderer Twin Screw Extruder with vacuum vented co-rotating mixing screws. The temperature was set at 200 to 250° C. and screw speed between 400 and 450 rpm. The extrudate was cooled through a water bath prior to pelletization. The typical output rate for this extruder was about 50 lbs/hr.

Testing Protocols/Techniques/Procedures

Intrinsic Viscosity (IV) data were collected on a Viscotek relative viscometer Y501C equipped with an autosampler and two Microlab 500 series pumps. A sample of about 0.2 g was weighed on an analytical balance and dissolved in about 35 mL of 60/40% phenol/TCE (1,1,2,2-tetrachloroethane) mixture. Each sample was measured twice and an average of the two measurements was recorded. A blank containing phenol/TCE was run in the beginning of the series. At the end of the series, a phenol/TCE wash was run to clean the system.

Chemical composition of the TPEE elastomers was determined with NMR Spectroscopy. A Varian Mercury NMR spectrometer (400 MHz) was utilized for these measurements. Samples were dissolved in $CDCl_3$/TFA-D (7:3 v/v) between 40 and 50 mg/ml.

The Vicat softening temperature (VST) is measured according to the standard ISO 306 test method. The sample is subject to 10N and the heating rate for the test is 50° C./hour.

Tensile performance data are measured according to ASTM D638 for Low-Modulus materials. This test method is used to determine the tensile properties of low-modulus plastic, ASTM Type I, dumbbell-shaped bars. The test has an initial speed of one inch per minute and after 50% strain increases to two inches per minute. The test runs until the sample break or until the extensometer reaches its extension limit of 400%. Tensile Modulus, Stress at 5% Strain, Stress at 10% Strain, Stress at 50% Strain, Stress at Maximum Strain, and Nominal Strain at Break are reported.

Heat aging is performed at a certain temperature and time duration using tensile bars as the test specimen. Typically 3 tensile bars are used to gather statistically relevant data. The tensile properties—Tensile Modulus, Stress at 5% Strain, Stress at 10% Strain, Stress at 50% Strain, Stress at Maximum Strain, and Nominal Strain at Break—are measured of the heat-aged samples.

Results/Discussion

In Table 2 four compositions are shown. The compositions labelled Ex. 1 and Ex. 2 are blends of PCR-PET based TPEE with PCR-PET based PBT, with additives, and in the case of Ex. 2 also colorants. Comparative examples CEx. 1 and CEx. 2 have very similar compositions, however, in these cases commercially available Hytrel 4056 TPEE was used instead of the PCR-PET bases TPEE.

TABLE 2

| Item Description | Unit | Ex. 1 | Ex. 2 | CEx. 1 | CEx. 2 |
|---|---|---|---|---|---|
| TPEE derived from PCR-PET | % | 70.85 | 70.29 | | |
| HYTREL 4056 | % | | | 70.85 | 70.29 |
| PBT derived from PCR-PET | % | 27.2 | 27.2 | 27.2 | 27.2 |
| Cycloaliphatic Epoxy Resin | % | 1.0 | 1.0 | 1.0 | 1.0 |
| Seenox 412S | % | 0.3 | 0.3 | 0.3 | 0.3 |
| Naugard 445 | % | 0.3 | 0.3 | 0.3 | 0.3 |
| Pentaerythritol Diphosphite | % | 0.3 | 0.3 | 0.3 | 0.3 |
| Sodium Stearate | % | 0.05 | 0.05 | 0.05 | 0.05 |
| Titanium Dioxide | % | | 0.25 | | 0.25 |
| Pigment Carbon Black | % | | 0.007 | | 0.007 |
| Pigment Green 7, Phthalo Cyanine | % | | 0.25 | | 0.25 |
| Solvent Yellow 93 | % | | 0.052 | | 0.052 |
| Total composition (%) | | 100 | 100 | 100 | 100 |

Table 3 gives an overview of a number of physical properties. Because there can be some effect of the colorants on properties, Ex. 1 should be compared with CEx. 1, and Ex. 2 with CEx. 2. These comparisons show no significant differences within the two pairs, although Ex. 1 appears to have a small melt volume flow rate (MVR) advantage over CEx. 1, and the same can be said of Ex. 2 versus CEx. 2.

TABLE 3

| Test Description | Unit | Ex. 1 | Ex. 2 | CEx. 1 | CEx. 2 |
|---|---|---|---|---|---|
| Melt Volume-flow Rate (MVR) - ISO1133 - 250° C., 1.2 kg, 240 sec dwell time | mL/10 min | 10.8 | 10.3 | 8.2 | 8.7 |
| Melt Volume-flow Rate (MVR) - ISO1133 - 250° C., 2.16 kg, 240 sec dwell time | mL/10 min | 20.0 | 19.6 | 16.8 | 16.7 |
| Flexural test - ASTM D 790, 3-point flexural test | | | | | |
| Flexural Modulus | MPa | 360 | 280 | 380 | 280 |
| Flex Stress at 5% Strain | MPa | 13.0 | 10.7 | 13.9 | 10.9 |
| Flexural Stress Yield | MPa | 14.9 | 13.4 | 15.8 | 13.3 |
| Flexural Stress at Break | MPa | NB | NB | NB | NB |
| Tensile Test - GE method based on ASTM D638 | | | | | |
| Modulus of Elasticity | MPa | 290 | 280 | 390 | 270 |
| Stress at 5% Strain | MPa | 8.3 | 8.5 | 9.7 | 8.4 |
| Stress at 10% Strain | MPa | 10.0 | 10.6 | 11.4 | 10.5 |
| Stress at 50% Strain | MPa | 11.8 | 12.9 | 13.2 | 12.9 |
| Nominal Strain at Break | % | >400 | >400 | >400 | >400 |
| Vicat softening temperature (VST) - ASTM D 1525 | | | | | |
| Cnd: Load | N | 10 | 10 | 10 | 10 |
| Cnd: Temp Rate | ° C./h | 50 | 50 | 50 | 50 |
| Temperature-Avg | ° C. | 129 | 131 | 127 | 125 |
| Temperature-Std | ° C. | 2 | 1 | 2 | 1 |

Another comparison was made on long-term properties. Samples were heat aged at two conditions: 1000 hours at 140° C. and 1000 hrs at 150° C. The tensile properties after heat aging are shown in Table 4. Comparing the same pairs as was done for the un-aged samples, Ex. 1 with CEx. 1, and Ex. 2 with CEx. 2, the composition based on PCR-PET derived TPEE heat ages in a very similar fashion as the comparative examples.

TABLE 4

| Test Description | Unit | Ex. 1 | Ex. 2 | CEx. 1 | CEx. 2 |
|---|---|---|---|---|---|
| Tensile Test after Heat aging 140° C., 1000 hrs - GE method based on ASTM D638 | | | | | |
| Modulus of Elasticity | MPa | 910 | 850 | 840 | 730 |
| Stress at 5% Strain | MPa | 15.8 | 15.0 | 15.7 | 14.4 |
| Stress at 10% Strain | MPa | 19.2 | 18.5 | 19.1 | 17.7 |
| Stress at 50% Strain | MPa | 20.2 | 19.9 | 20.3 | 19.5 |
| Stress at Break-Avg | MPa | 18.7 | 19 | 21 | 19.7 |
| Nominal Strain at Break-Avg | % | 100 | 70 | 290 | 150 |
| Nominal Strain at Break-Std | % | 20 | 10 | 20 | 10 |
| Tensile Test after Heat aging 150° C., 1000 hrs - GE method based on ASTM D638 | | | | | |
| Modulus of Elasticity | MPa | 1100 | 1100 | 1200 | 1100 |
| Stress at 5% Strain | MPa | 17.9 | 19.0 | 21.2 | 17.6 |
| Stress at 10% Strain | MPa | 21.6 | 23.1 | 25.6 | 21.6 |
| Stress at 50% Strain | MPa | 19.9 | 22.8 | 24.7 | 22.6 |
| Stress at Break-Avg | MPa | 13.5 | 20.5 | 22.5 | 20 |
| Nominal Strain at Break-Avg | % | 60 | 40 | 120 | 70 |
| Nominal Strain at Break-Std | % | 20 | 10 | 60 | 20 |

Both comparative examples appear to have a higher strain to break when heat aged for 1000 hours at 140° C., but that advantage vanishes at heat aging at 150° C. for 1000 hours, especially in consideration of the relatively large standard deviation of Strain to Break in the case of the 150° C. heat aged CEx. 1. This is surprising as one might have expected some of the impurities carried over into the TPEE derived from PCR-PET to affect heat aging negatively.

The compositions of another set of materials that were prepared are shown in Table 5. The main differences compared to material compositions as listed in Table 2 are in the additive packages.

TABLE 5

| Item Description | Unit | Ex. 3 | Ex. 4 | Ex. 5 | CEx. 3 | CEx. 4 | CEx. 5 |
|---|---|---|---|---|---|---|---|
| TPEE derived from PCR-PET | % | 69.15 | 69.15 | 68.8 | | | |
| HYTREL 4056 | % | | | | 69.15 | 69.15 | 68.8 |
| PBT derived from PCR-PET | % | 26.5 | 26.5 | 26.35 | | | |
| VALOX 315 (PBT) | % | | | | 26.5 | 26.5 | 26.35 |
| Diglycidylether of bisphenol A, MW about 1000 | | 3.4 | 3.4 | 3.4 | 3.4 | 3.4 | 3.4 |
| ULTRATALC 609 | % | | | 0.5 | | | 0.5 |
| SEENOX 412S pentaerythritol beta-laurylthiopropionate | % | 0.3 | 0.3 | 0.3 | 0.3 | 0.3 | 0.3 |
| Naugard 445 | % | 0.3 | | 0.3 | | 0.3 | 0.3 |
| Tinuvin 622LD | | | 0.3 | | 0.3 | | |
| Pentaerythritol Diphosphite | % | 0.3 | 0.3 | 0.3 | 0.3 | 0.3 | 0.3 |
| Sodium Stearate | % | 0.05 | 0.05 | 0.05 | 0.05 | 0.05 | 0.05 |
| Total composition (%) | | 100 | 100 | 100 | 100 | 100 | 100 |

The physical properties of these materials are given in Table 6. The proper comparisons are between the following pairs of materials: Ex. 3 versus CEx. 3, Ex. 4 versus CEx. 4, and Ex. 5 versus CEx. 5. In general, the modulus values of Ex. 3, Ex. 4 and Ex. 5 are slightly higher than those of CEx. 3, CEx. 4 and CEx. 5, respectively. However, all other properties do not show significant differences.

TABLE 6

| Test Description | Unit | Ex. 3 | Ex. 4 | Ex. 5 | CEx. 3 | CEx. 4 | CEx. 6 |
|---|---|---|---|---|---|---|---|
| Melt Volume-flow Rate (MVR) - ISO1133 - 250° C., 1.2 kg, 240 sec dwell time | mL/10 min | 12.2 | 16.2 | 15.0 | 11.6 | 13.5 | 12.3 |
| Flexural test - ASTM D 790, 3-point flexural test | | | | | | | |
| Flexural Modulus | MPa | 436 | 360 | 349 | 255 | 205 | 217 |
| Flex Stress at 5% Strain | MPa | 16.2 | 13.4 | 13.0 | 10.4 | 8.5 | 9.0 |
| Flexural Stress at Yield | MPa | 18.2 | 13.4 | 16.0 | 12.4 | 11.0 | 11.8 |
| Flexural Stress at Break | MPa | NB | NB | NB | NB | NB | NB |
| Tensile Test - GE method based on ASTM D638 | | | | | | | |
| Modulus of Elasticity-Avg | MPa | 500 | 320 | 350 | 239 | 197 | 224 |
| Modulus of Elasticity-Std | MPa | 60 | 10 | 10 | 3 | 3 | 4 |
| Stress at 5% Strain | MPa | 11.5 | 8.4 | 9.3 | 7.5 | 6.5 | 7.3 |
| Stress at 10% Strain | MPa | 13.6 | 10.2 | 11.3 | 9.6 | 8.7 | 9.5 |
| Stress at 50% Strain | MPa | 15.5 | 12.1 | 13.3 | 12.1 | 11.2 | 12 |
| Nominal Strain at Break | % | >400 | >400 | >400 | >400 | >400 | >400 |
| Izod Impact - ASTM D256, ASTM D4812 - measured at −40° C. | J/m | 730 | 420 | | 690 | 560 | |
| Izod Impact - ASTM D256, ASTM D4812 - measured at −60° C. | J/m | 180 | 50 | | 250 | 690 | |
| Izod Impact - ISO180 - measured at −40° C. | kJ/m2 | 86 | 72 | | 90 | 84 | |
| Izod Impact - ISO180 - measured at −60° C. | kJ/m2 | 12 | 72 | | 6 | 14 | |
| Mold shrinkage parallel to flow | % | 1.10 | 1.08 | | 1.05 | 1.08 | |
| Mold shrinkage perpendicular to flow | % | 1.10 | 1.17 | | 1.03 | 1.05 | |
| Vicat softening temperature (VST) - ASTM D 1525 - 10N, 50° C./h | ° C. | | | 130 | | | 122 |
| Vicat softening temperature (VST) - ASTM D 1525 - 10N, 120° C./h | ° C. | | | 131 | | | 121 |

TABLE 6-continued

| Test Description | Unit | Ex. 3 | Ex. 4 | Ex. 5 | CEx. 3 | CEx. 4 | CEx. 6 |
|---|---|---|---|---|---|---|---|
| Vicat softening temperature (VST) - ISO306 - 10N, 50° C./h | ° C. | 134 | 127 | | 127 | 124 | |
| Specific Gravity - ASTM D 792 | | 1.202 | 1.193 | | 1.196 | 1.193 | |

As with the first set of materials, heat aging experiments (Table 7) were performed to test the effect of composition on long term performance.

Also in this comparison, surprisingly it was found that the compositions based on TPEE derived from PCR-PET performed similarly to the Hytrel 4056 based compositions, and outperformed the Hytrel 4056 based compositions in heat aging at 150° C. based on the Strain at Break.

TABLE 7

| Test Description | Unit | Ex. 3 | Ex. 4 | CEx. 3 | CEx. 4 |
|---|---|---|---|---|---|
| Tensile Test after Heat aging 140 C., 1000 hrs - GE method based on ASTM D638 | | | | | |
| Modulus of Elasticity-Avg | MPa | 780 | 430 | 220 | 240 |
| Stress at 5% Strain-Avg | MPa | 16.1 | 9.2 | 6.9 | 7 |
| Stress at 10% Strain-Avg | MPa | 19 | 11.3 | 9.4 | 9.5 |
| Stress at 10% Strain-Std | MPa | 0.4 | 0 | 0.1 | 0.4 |
| Stress at 50% Strain-Avg | MPa | 22.1 | 14.5 | 13.7 | 13.9 |
| Stress at Break-Avg | MPa | 27.3 | 16 | 18 | 17 |
| Nominal Strain at Break-Avg | % | 280 | 170 | 230 | 130 |
| Nominal Strain at Break-Std | % | 20 | 20 | 60 | 10 |
| Tensile Test after Heat aging 150 C., 1000 hrs - GE method based on ASTM D638 | | | | | |
| Modulus of Elasticity-Avg | MPa | 1500 | 540 | 320 | 390 |
| Stress at 5% Strain-Avg | MPa | 26.5 | 13.1 | 9 | 10.6 |
| Stress at 10% Strain-Avg | MPa | 30.9 | 16.3 | 11.8 | 13.9 |
| Stress at 50% Strain-Avg | MPa | 30.9 | 20.4 | 16.5 | 18.7 |
| Stress at Break-Avg | MPa | 33.0 | 28.5 | 19.5 | 23.0 |
| Nominal Strain at Break-Avg | % | 200 | 220 | 90 | 120 |
| Nominal Strain at Break-Std | % | 70 | 50 | 10 | 30 |

The prefix "Bio-" indicates the material is biomass-derived.

TABLE 8

Materials.

| COMPONENT | CHEMICAL DESCRIPTION | SOURCE, VENDOR |
|---|---|---|
| Recycled PET | Polyethylene terephthalate obtained from scrap PET bottles for recycle | Futura, India |
| Bio-Succinic acid | 1,4-butane dicarboxylic acid derived from corn sugar | Diversified Natural Products, Inc. |
| Triisopropyl ortho titanate (TPT) | Triisopropyl orthotitanate (TPT) | Aldrich, USA |
| Commercial polyTHF | Poly(tetrahydrofuran) | Aldrich, USA |
| Bio-PolyTHF | Poly(tetrahydrofuran) derived from bio-BDO | Prepared from bio-BDO |
| Ethylene Glycol | 1,2-Dihydroxyethane | Merck |

Example 6 (Table 8) demonstrates the preparation of a copolyetherester from biomass-derived 1,4-butanediol. PET (recycle) 4.8 g (25 mmol) and ethylene glycol 3.87 g (62.4 mmol) were added to a reactor and heated to 180° C. under nitrogen atmosphere. At 180° C., the catalyst triisopropylorthotitanate (TPT) 200 ppm was added and heating was continued to 225-230° C. and kept for 90 minutes. 1,4-butanediol (BDO) 3.37 g (37.44 mmol) derived from bio-succinic acid and polyTHF 1.65 g was added to the reaction mass and continued the reaction for another 20 minutes with distilling off ethylene glycol, methanol, THF and butanediol from the reaction. Vacuum was applied in a stepwise manner starting from 700 mbar to 500, 300, 100, 75, 50, 25, 10, 5.5, 1.5 and finally to less than 1.0 mbar. The molten reaction mass was kept at 0.7 to 0.5 mbar for 30 minutes and finally the polymer was drained off the reactor under nitrogen pressure.

The polyester thus obtained had an IV of 0.70 dL/g, melting temperature ($T_m$) 182.05° C. and glass transition temperature ($T_g$)-28° C. The polyester had a weight average molecular weight ($M_w$) of 50702 and a number average molecular weight ($M_n$) of 10175 ($M_w/M_n$=4.98).

Example 7

This example demonstrates the preparation of a copolyetherester made from recycled PET, biomass-derived BDO and biomass-derived polyTHF. PET (recycle) 3.49 g (18.17 mmol) and ethylene glycol 2.82 g (45.48 mmol) were added to a reactor and heated to 180° C. under nitrogen atmosphere. At 180° C., the catalyst triisopropylorthotitanate (TPT) 200 ppm was added and heating was continued to 225-230° C. and kept for 90 minutes. 1,4-butanediol (BDO) 2.45 g (27.22 mmol) derived from bio-succinic acid, and bio-polyTHF 1.20 g derived from bio-BDO, were added to the reaction mass and the reaction was continued for another 20 minutes while distilling off ethylene glycol, methanol, THF and butanediol from the reaction. Vacuum was applied in a stepwise manner starting from 700 mbar to 500, 300, 100, 75, 50, 25, 10, 5.5, 1.5 and finally to less than 1.0 mbar. The molten reaction mass was kept at 0.7 to 0.5 mbar for 30 minutes and finally the polymer was drained off the reactor under nitrogen pressure.

The polyester thus obtained had an IV of 0.74 dL/g melting temperature ($T_m$) of 197° C. and glass transition temperature ($T_g$) of −20° C. The polyester had a weight average molecular weight ($M_w$) of 60855 and a number average molecular weight (Me) of 12514 ($M_w/M_n$=4.86)

Example 8

This example demonstrates the preparation of biomass-derived THF from biomass-derived BDO. Bio-BDO (60 g) (synthesized from bio-succinic acid) and o-phosphoric acid (6 g) were placed in a round-bottomed flask fitted with a distillation set-up and provided with a magnetic stirrer. The reaction mass was heated to 170-175° C. using an oil bath. The splitting off of water starts at about 165° C. and a mixture of tetrahydrofuran with water starts distilling. About 56 g of this mixture is collected in the distillate (about 20% water). This mixture is subjected to $CaCl_2$ treatment to remove water and dried further by refluxing in metallic sodium to remove moisture traces to obtain dried biomass-derived THF.

Example 9

This example demonstrates the preparation of biomass-derived polyTHF. Dried biomass-derived THF (20 g) (synthesized from Bio-BDO) and fluorosulfonic acid (3.6 g) were placed in a round-bottomed flask and stirred for 3 hrs at 35° C. At the end of 3 hours the reaction temperature was cooled to around 5° C. using an ice-bath. The stirring was continued further for an hour. The reaction was quenched using 50 ml water at the end of 4 hrs from the start of the reaction. The reaction mass was neutralized using 3.5% sodium carbonate ($Na_2CO_3$) solution. The unreacted THF was stripped off this mixture under vacuum and the resulting solution was extracted using toluene. The separated toluene layer was dried using sodium sulfate and evaporated the toluene to obtain bio-polyTHF, which was used in further polymerizations.

Although the present invention has been described in detail with reference to certain preferred versions thereof, other variations are possible. Therefore, the spirit and scope of the appended claims should not be limited to the description of the versions contained therein.

What is claimed is:

1. A composition comprising
   (1) from 50 to 99 wt % of a modified, random copolyetherester containing:
      (i) a modified, random polybutylene terephthalate copolymer block that is derived from a depolymerized polyethylene terephthalate component selected from the group consisting of polyethylene terephthalate, polyethylene terephthalate copolymers, and combinations thereof; and that contains at least one residue derived from the depolymerized polyethylene terephthalate component; and
      (ii) a polyalkylene oxide copolymer block that is derived from the depolymerized polyethylene terephthalate component and polyalkylene oxide glycol, and contains polyalkylene oxide and at least one residue derived from the depolymerized polyethylene terephthalate component;
   wherein the residues comprise diethylene glycol groups present in the copolyetherester in an amount from 0.1 to 10 mole %, based on 100 mole % of glycol groups in the copolyetherester; and
   (2) from 1 to 50 wt % of a modified, random polybutylene terephthalate copolymer that is derived from a depolymerized polyethylene terephthalate component selected from the group consisting of polyethylene terephthalate, polyethylene terephthalate copolymers, and combinations thereof; and that contains at least one residue derived from the depolymerized polyethylene terephthalate component;
   wherein the copolyetherester, the modified, random polybutylene terephthalate copolymer, and optionally any additives, are present in a total amount of 100 wt %; and
   wherein the copolyetherester has
   (a) long chain ester units having the formula:

wherein G is the divalent polyalkylene oxide radical remaining after removal of the terminal hydroxyl groups from a poly(butylene oxide) glycol having a number-average molecular weight of 100 to 5000 daltons; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and
   (b) short-chain ester units having the formula:

wherein D is the divalent butylene radical remaining after removal of the hydroxyl groups from butanediol having a molecular weight of less than 150; and R' and R" are as defined above; and
wherein D' is a divalent ethylene or diethylene radical after removal of hydroxyl groups of ethylene glycol or diethylene glycol;
wherein the composition has a modulus of elasticity at least 8.3% greater than the composition in which the copolyetherester is not derived from a depolymerized polyethylene terephthalate component, when the compositions are aged for 1000 hours at 140° C.

2. The composition of claim 1, wherein the copolyetherester comprises from 5 to 95 wt % of the polyalkylene oxide block, basesd on the total weight of the copolyetherester.

3. The composition of claim 1, wherein the copolyetherester comprises from 20 to 80 wt % of the modified, polybutylene terephthalate random copolymer block, based on the total weight of the copolyetherester.

4. The composition of claim 1, wherein the polyalkylene oxide glycol is selected from the group consisting of polyethylene oxide glycol, polypropylene oxide glycol, polybutylene oxide glycol, and combinations thereof.

5. The composition of claim 4, wherein the polyalkylene oxide copolymer block comprises poly(1,4-butylene oxide).

6. The composition of claim 5, wherein the poly(1,4-butylene oxide) is derived from a poly(1,4-butylene oxide) glycol component having a number average molecular weight of 100 to 5000 daltons and a poly(1,4-butylene oxide) component having a molecular weight of less than 2500 daltons.

7. The composition of claim 1, wherein the copolyetherester comprises from 20 to 95 mole percent of the modified, random polybutylene terephthalate copolymer block.

8. The composition of claim 7, wherein the copolyetherester comprises from 5 to 80 weight percent of the polyalkylene oxide block, based on the total weight of the copolyetherester.

9. The composition of claim 1, wherein the at least one residue derived from the depolymerized polyethylene terephthalate component further comprises a residue selected from the group consisting of isophthalic acid groups, cobalt-containing compounds, antimony-containing compounds, germanium-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline salts, naphthalene dicarboxylic acids, 1,3-propane diol groups, and combinations thereof.

10. The composition of claim 9, wherein the at least one residues derived from the depolymerized polyethylene terephthalate component further comprises a residue selected from the group consisting of isophthalic acid groups, the cis isomer of 1,3-cyclohexane dimethanol, the trans isomer of 1,3-cyclohexane dimethanol, the cis isomer of 1,4-cyclohexane dimethanol, the trans isomer of 1,4-cyclohexane dimethanol, and combinations thereof.

11. The composition of claim 10, wherein the at least one residue derived from the depolymerized polyethylene terephthalate component further comprises a residue selected from the group consisting of the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, and combinations thereof.

12. The composition of claim 11, wherein the at least one residue derived from the depolymerized polyethylene terephthalate component comprises a cobalt-containing compound.

13. The composition of claim 12, wherein the at least one residue derived from the depolymerized polyethylene terephthalate component further comprises an isophthalic acid group.

14. The composition of claim 1, wherein at least one of the residues derived from the polyethylene terephthalate component further comprises an isophthalic acid group.

15. The composition of claim 14, wherein at least one of the residues derived from the polyethylene terephthalate component is selected from the group consisting of the cis isomer of 1,3-cyclohexane dimethanol, cis isomer of 1,4-cyclohexane dimethanol, a trans isomer of 1,3-cyclohexane dimethanol, a trans isomer of 1,4-cyclohexane dimethanol, or combinations thereof.

16. The composition of claim 1, wherein at least one of the residues derived from the polyethylene terephthalate component is selected from the group consisting of ethylene glycol groups, diethylene glycol groups, and cyclohexane dimethanol groups and is in an amount of from 0.1 to 10 mole %, based on 100 mole % of glycol in the composition.

17. The composition of claim 16, wherein the residue derived from the polyethylene terephthalate component further comprises isophthalic acid groups in an amount ranging from greater than 0 to 10 mole %, based on 100 mole % of acid functionality in the polybutylene terephthalate random copolymer.

18. An article molded or extruded from the composition of claim 1.

19. The composition of claim 1, wherein the at least one residue is derived from a member selected from the group consisting of 1,4-butane diol, 1,3-propane diol, polyalkylene oxide, and combinations thereof, which are derived from a biomass.

20. The composition of claim 19, wherein the biomass is selected from the group consisting of cellulosic materials, grains, and combinations thereof.

21. The composition of claim 20, wherein the grain is selected from the group consisting of corn, wheat, and combinations thereof.

22. The composition of claim 1, wherein the composition further comprises a carboxy reactive component in an amount from 0.01 to 5 wt %, based on the total weight of the composition.

23. The composition of claim 1, wherein the composition further comprises a flame retardant in an amount from 0.01 to 30 wt %, based on the total weight of the composition.

24. The composition of claim 1, wherein the modified, random polybutylene terephthalate copolymer is a polyalkylene terephthalate selected from the group consisting of polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylene terephthalate, polydianol terephthalates, polybutylene terephthalate, polyester naphthalates, and combinations thereof.

25. A process for making the composition of claim 1, the process comprising:
(1) forming a modified, random copolyetherester by:
(a) depolymerizing a polyethylene terephthalate component selected from the group consisting of polyethylene terephthalate, polyethylene terephthalate copolymers, and combinations thereof by reacting the
(i) polyethylene terephthalate component with
(ii) 1,4-butane diol at a pressure that is at least atmospheric pressure in the presence of a catalyst component, under an inert atmosphere conditions sufficient to depolymerize the polyethylene terephthalate component into a molten mixture containing oligomers, 1,4-butane diol, ethylene glycol, diethylene glycol, and mixtures thereof;
wherein the polyethylene terephthalate component and the diol are combined in the phase under agitation and the diol is refluxed back into the reactor; and
(b) agitating the molten mixture under subatmospheric pressure and removing excess diol, ethylene glycol, and tetrahydrofuran;
wherein a polyalkylene oxide glycol is added during the process in an amount and under conditions that are sufficient to form the copolyetherester; and
wherein the copolyetherester comprises:
(i) a modified, random polybutylene terephthalate copolymer block that is derived from a depolymerized polyethylene terephthalate component selected from the group consisting of polyethylene terephthalate, polyethylene terephthalate copolymers, and combinations thereof; and that contains at least one residue derived from the depolymerized polyethylene terephthalate component; and
(ii) a polyalkylene oxide copolymer block that is derived from the depolymerized polyethylene terephthalate component and polyalkylene oxide glycol, and contains polyalkylene oxide and at least one residue derived from the depolymerized polyethylene terephthalate component; and further
wherein the copolyetherester comprises diethylene glycol groups present in the copolyetherester in an amount from 0.1 to 10 mole %, based on 100 mole % of glycol groups in the copolyetherester; and
(2) forming a composition by combining from 50 to 99 wt % of the modified, random copolyetherester and from 1 to 50 wt % of a of a modified, random polybutylene terephthalate copolymer that is derived from a depolymerized polyethylene terephthalate component selected from the group consisting of polyethylene terephthalate, polyethylene terephthalate copolymers, and combinations thereof; and that contains at least one residue derived from the depolymerized polyethylene terephthalate component,
wherein the copolyetherester, the polyester, and optionally any additives, are present in a total amount of 100 wt %; and wherein the copolyetherester has
(a) long chain ester units having the formula:

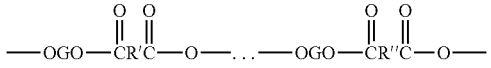

wherein G is the divalent polyalkylene oxide radical remaining after removal of the terminal hydroxyl groups from a poly(butylene oxide) glycol having a number-average molecular weight of 100 to 5000 daltons; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (b) short-chain ester units having the formula:

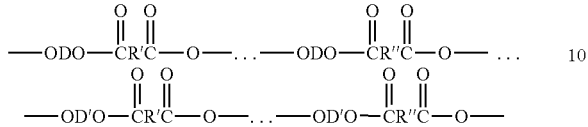

wherein D is the divalent butylene radical remaining after removal of the hydroxyl groups from butanediol having a molecular weight of less than 150, R' and R" are as defined above, and D' is a divalent ethylene or diethylene radical after removal of hydroxyl groups of ethylene glycol or diethylene glycol; and wherein the composition has a modulus of elasticity at least 8.3% greater than the composition in which the copolyetherester is not derived from a depolymerized polyethylene terephthalate component, when the compositions are aged for 1000 hours at 140° C.

26. The process of claim 25, wherein the polyalkylene oxide glycol is selected from the group consisting polyethylene oxide glycols, polypropylene oxide glycols, polybutylene oxide glycols, and combinations thereof.

27. The process of claim 25, wherein the polyethylene terephthalate component is depolymerized at a temperature ranging from 180° C. to 260° C.

28. The process of claim 25, wherein the temperature of the molten mixture is increased to a temperature ranging from 240° C. to 270° C.

29. The process of claim 25, wherein the polyalkylene oxide glycol is added during the agitation of the molten mixture under subatmospheric pressure.

30. The process of claim 25, wherein the polyalkylene oxide glycol is added during the agitation of the molten mixture under subatmospheric pressure.

31. The process of claim 25, wherein a member selected from the group consisting of 1,4-butane diol, 1,3-propane diol, polyalkylene oxide glycol, and combinations thereof is derived from biomass.

32. The process of claim 31, wherein the biomass is a grain selected from the group consisting of corn, wheat, and combinations thereof.

33. A process for making the composition of claim 1, the process comprising:

(1) forming a modified, random copolyetherester by:

(a) depolymerizing a polyethylene terephthalate component selected from the group consisting of polyethylene terephthalate polyethylene terephthalate copolymers, and combinations thereof by agitating the polyethylene terephthalate component with a member selected from the group consisting of ethylene glycol, 1,3-propane diol, and combinations thereof, in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol, and combinations thereof;

(b) adding 1,4-butane diol to the first molten mixture in a reactor in the presence of a catalyst component, under conditions that are sufficient to form a second molten mixture containing a component selected from the group consisting of oligomers containing ethylene terephthalate moieties, oligomers containing terephthalate moieties, propylene glycol, 1,4-butane diol, ethylene glycol, diethylene glycol, and combinations thereof; and (c) subjecting the second molten mixture to subatmospheric conditions and agitation sufficient to form the copolyetherester;

wherein a polyalkylene oxide glycol is added during the process in an amount and under conditions that are sufficient to form the copolyetherester and oligomers containing terephthalate moieties, propylene glycol, and ethylene glycol are removed during formation of the copolyetherester; and wherein the copolyetherester diethylene glycol groups are present in an amount from 0.1 to 10 mole %, based on 100 mole % of glycol groups in the copolyetherester; and wherein the copolyetherester comprises:

(i) a modified, random polybutylene terephthalate copolymer block that is derived from the depolymerized polyethylene terephthalate component selected from the group consisting of polyethylene terephthalate, polyethylene terephthalate copolymers, and combinations thereof; and that contains at least one residue derived from the depolymerized polyethylene terephthalate component; and iii) a polyalkylene oxide copolymer block that is derived from the depolymerized polyethylene terephthalate component and polyalkylene oxide glycol, and contains polyalkylene oxide and at least one residue derived from the depolymerized polyethylene terephthalate component; and 2 forming composition by combining from 50 to 99 wt % of the modified random copolyetherester and from 1 to 50 wt % of a of a modified, random polybutylene terephthalate copolymer that is derived from a depolymerized polyethylene terephthalate component selected from the group consisting of polyethylene terephthalate, polyethylene terephthalate copolymers, and combinations thereof; and that contains at least one residue derived from the depolymerized polyethylene terephthalate component, wherein the copolyetherester, the polyester, and optionally any additives, are present in a total amount of 100 wt %; and wherein the copolyetherester has (a) long chain units having the formula:

wherein G is the divalent polyalkylene oxide radical remaining after removal of the terminal hydroxyl groups from a poly(butylene oxide) glycol having a number-average molecular weight of 100 to 5000 daltons; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (b) short-chain ester units having the formula:

wherein D is the divalent butylene radical remaining after removal of the hydroxyl groups from butanediol having a molecular weight of less than 150, R' and R" are as defined above, and D' is a divalent ethylene or diethylene radical after removal of hydroxyl groups of ethylene glycol or diethylene glycol; and wherein the composition has a modulus of elasticity at least 8.3% greater than the composition in which the copolyetherester is not derived from a depolymerized polyethylene terephthalate component, when the compositions are aged for 1000 hours at 140° C..

34. The process of claim 33, wherein the polyethylene terephthalate component is depolymerized at a temperature ranging from 190° C. to 250° C., under an inert atmosphere.

35. The process of claim 33, wherein step (b) is conducted at a temperature ranging from 190° C. to 240° C.

36. The process of claim 33, wherein during step (c), the temperature is increased to a temperature ranging from 240° C. to 260° C.

37. The process of claim 33, wherein the polyalkylene oxide glycol is added during the depolymerization of the polyethylene terephthalate component.

38. The process of claim 33, wherein the polyalkylene oxide glycol is added during the agitation of the first molten mixture.

39. The process of claim 33, wherein the polyalkylene oxide glycol is added during the agitation of the second molten mixture.

40. The process of claim 33, wherein the member selected from the group consisting of 1,4-butane diol, 1,3-propane diol, polyalkylene oxide glycol, and combinations thereof is derived from biomass.

41. The process of claim 40, wherein the biomass is a grain selected from the group consisting of corn, wheat, and combinations thereof.

42. The process of claim 33, wherein the polyalkylene oxide glycol is selected from the group consisting of polyethylene oxide glycols, polypropylene oxide glycols, polybutylene oxide glycols, and combinations thereof.

43. The composition of claim 1, comprising:
 (a) from 55 to 99 wt % of the modified, random copolyetherester
 (b) from 10 to 45 wt % of the modified polybutylene terephthalate copolymer;
 (c) from 0.01 to 5 wt % of a carboxy reactive material,
 (d) from 0.01 to 2 wt % of a stabilizer composition selected from the group consisting of hindered diol stabilizers, thioester stabilizers, amine stabilizers, phosphite stabilizers, and combinations thereof,
 (e) from 0 to 5 wt % of at least one colorant,
 wherein (a) to (e) are present in a total amount of 100 wt %.

44. An article comprising the composition of claim 1.

45. The article of claim 44, wherein the article is in the form of a constant velocity joint boot, a prop shaft boot, a rear wheel drive boot, an air duct, a hose or a tube.

46. A method of forming a composition with improved heat stability, comprising melt blending the components of the composition of claim 1.

47. A method of forming an article, comprising shaping, extruding, blow molding, or injection molding the composition of claim 43.

48. An article comprising the composition of claim 43.

49. The article of claim 48, wherein the article is selected from the group consisting of constant velocity joint boots, prop shaft boots, rear wheel drive boots, air ducts, hoses, tubes, and combinations thereof.

50. A method of forming a composition with improved heat stability, comprising melt blending the components of the composition of claim 43.

51. A method of forming an article, comprising shaping, extruding, blow molding, or injection molding the composition of claim 43 to form an article.

* * * * *